United States Patent
Garcia Crespo (10) Patent No.: US 9,482,108 B2
(45) Date of Patent: Nov. 1, 2016

(54) TURBOMACHINE BLADE ASSEMBLY

(71) Applicant: General Electric Company, Schenectady, NY (US)

(72) Inventor: Andres Jose Garcia Crespo, Greenville, SC (US)

(73) Assignee: General Electric Company, Schenectady, NY (US)

( * ) Notice: Subject to any disclaimer, the term of this patent is extended or adjusted under 35 U.S.C. 154(b) by 614 days.

(21) Appl. No.: 13/856,303

(22) Filed: Apr. 3, 2013

(65) Prior Publication Data

US 2014/0301850 A1  Oct. 9, 2014

(51) Int. Cl.
| | |
|---|---|
| F01D 5/30 | (2006.01) |
| F01D 11/00 | (2006.01) |
| F01D 5/28 | (2006.01) |
| F01D 5/08 | (2006.01) |
| F01D 5/14 | (2006.01) |
| F01D 5/22 | (2006.01) |

(52) U.S. Cl.
CPC ............. *F01D 11/008* (2013.01); *F01D 5/081* (2013.01); *F01D 5/147* (2013.01); *F01D 5/22* (2013.01); *F01D 5/282* (2013.01); *F01D 5/284* (2013.01); *F01D 5/3023* (2013.01); *F05D 2300/6033* (2013.01); *Y02E 20/16* (2013.01); *Y02T 50/672* (2013.01); *Y02T 50/676* (2013.01)

(58) Field of Classification Search
USPC ......... 416/193 A, 219 R, 241 R, 241 B, 248; 29/889.2, 889.71
See application file for complete search history.

(56) References Cited

U.S. PATENT DOCUMENTS

| | | | |
|---|---|---|---|
| 3,810,711 A * | 5/1974 | Emmerson | F01D 5/184 29/889.721 |
| 4,084,922 A | 4/1978 | Glenn | |
| 4,285,634 A | 8/1981 | Rossman et al. | |
| 5,222,865 A * | 6/1993 | Corsmeier | F01D 11/008 416/193 A |
| 5,785,498 A * | 7/1998 | Quinn et al. | 416/224 |
| 7,080,971 B2 * | 7/2006 | Wilson | F01D 5/147 416/92 |
| 7,442,444 B2 * | 10/2008 | Hazel et al. | 428/641 |
| 7,510,379 B2 | 3/2009 | Marusko et al. | |
| 7,963,745 B1 | 6/2011 | Liang | |
| 8,186,946 B2 * | 5/2012 | Parkos et al. | 415/173.4 |
| 8,496,443 B2 * | 7/2013 | Campbell | F01D 5/081 416/248 |
| 8,607,454 B2 * | 12/2013 | Blanchard | B29C 70/24 156/148 |
| 8,714,932 B2 | 5/2014 | Noe et al. | |
| 8,967,974 B2 * | 3/2015 | Garcia-Crespo | 416/193 A |
| 9,062,562 B2 * | 6/2015 | Coupe et al. | |

(Continued)

FOREIGN PATENT DOCUMENTS

| | | |
|---|---|---|
| CN | 101042055 A | 9/2007 |
| CN | 2010/077401 A2 | 7/2010 |

(Continued)

OTHER PUBLICATIONS

CN Office Action; Application No. CN 201410043286.1; Dated Jun. 13, 2016; 9 pages.

*Primary Examiner* — Binh Q Tran
(74) *Attorney, Agent, or Firm* — Fletcher Yoder, P.C.

(57) ABSTRACT

Embodiments of the present disclosure include a system comprising a turbomachine blade assembly having a blade portion, a shank portion, and a mounting portion, wherein the blade portion, the shank portion, and the mounting portion comprise a first plurality of plies extending from a tip of the airfoil to a base of the dovetail.

23 Claims, 8 Drawing Sheets

(56) References Cited

U.S. PATENT DOCUMENTS

2011/0142639 A1 6/2011 Campbell et al.
2012/0055609 A1 3/2012 Blanchard et al.

FOREIGN PATENT DOCUMENTS

EP 2469026 A2 6/2012
WO 2010116066 10/2010

* cited by examiner

TURBOMACHINE BLADE ASSEMBLY

STATEMENT REGARDING FEDERALLY SPONSORED RESEARCH & DEVELOPMENT

This invention was made with Government support under grant number DE-FC26-05NT42643-DOE awarded by the Department of Energy. The Government has certain rights in the invention.

BACKGROUND OF THE INVENTION

The subject matter disclosed herein relates to turbomachines, and, more particularly, to systems and method for making and using turbomachine blades.

Turbomachines include compressors and turbines, such as gas turbines, steam turbines, jet engines, and hydro turbines. Generally, turbomachines include a rotor, which may be a shaft or drum, which support turbomachine blades. For example, the turbomachine blades may be attached to the rotor by a mounting segment, which mates with a slot in the rotor. Additionally, turbomachine blades may include other components, such as platforms, seals, anti-rotation devices, shanks, and other components. Unfortunately, turbomachine blades may be formed from materials that are susceptible to elevated temperatures and stresses, which can cause premature wear and degradation.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a turbomachine blade assembly having a blade portion, a shank portion, and a mounting portion, wherein the blade portion, the shank portion, and the mounting portion comprise a first plurality of plies extending from a tip of the blade portion to a base of the mounting portion.

In a second embodiment, a system includes a first turbomachine blade having a blade portion comprising a hollow cavity, a shank portion comprising a pressurization port fluidly coupled to the hollow cavity, and a mounting portion configured to couple the first turbomachine blade to a rotor.

In a third embodiment, a turbomachine blade assembly comprises a first portion, a second portion, a third portion, and a fourth portion. The first portion includes an airfoil portion, a shank portion, and a dovetail portion, wherein the first portion comprises a first plurality of plies. The second portion includes a platform arch disposed about the first portion, wherein the platform arch comprises a second plurality of plies. The third portion includes a plurality of angel wings disposed adjacent the platform arch, wherein the plurality of angel wings comprises a third plurality of plies. The fourth portion includes a fillet portion extending over the airfoil portion and the platform arch, wherein the fillet portion comprises a fourth plurality of plies, and wherein the first, second, third, and fourth pluralities of plies are laminated to one another to form a single piece.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments include an improved turbomachine blade assembly, and a process or method for forming the improved turbomachine blade assembly. More specifically, certain embodiments include a turbomachine blade assembly, where one or more components of the turbomachine blade assembly are formed from a plurality of continuous, fiber-reinforced plies or layers. In the manner described in detail below, the turbomachine blade assembly and/or the components of the turbomachine blade assembly may be formed by positioning the plurality of continuous, fiber-reinforced plies or layers in a mold, and the plies or layers may then be laminated together using a tooling process, a machining process, a chemical process, a metallurgical process, or a combination thereof. For example, the turbomachine blade assemblies may each be formed as a single piece from laminated layers of a composite material, such as a ceramic-based composite material or other composite material (e.g., a material having fibers distributed throughout a matrix material). For example, the ceramic-based composite material may include a ceramic matrix material (e.g., silicon carbide or oxide matrices) with ceramic fibers (e.g., silicon carbide, carbon, or oxide fibers) dispersed throughout the ceramic matrix material. As a result, the turbomachine blade assemblies may be capable of withstanding elevated temperatures without cooling.

Furthermore, in certain embodiments, the turbomachine blade assembly may include a hollow blade portion (e.g., a hollow airfoil). For example, the hollow airfoil may include a passage or port connecting the hollow interior of the airfoil to a shank cavity of the turbomachine. In this manner, a pressurized flow (e.g., air flow) within the shank cavity may flow into the hollow interior of the airfoil of the turbomachine blade. As the hollow interior of the airfoil of each turbomachine blade assembly is pressurized, the turbomachine blade assembly may be protected from foreign object damage and impact degradation. Moreover, to maintain pressurization of the flow within the shank cavity and the hollow interiors of the airfoils, sealing pins may be disposed between the turbomachine blades to block leakage of the pressurized flow from the shank cavity to the surrounding atmosphere. While the embodiments disclosed below are described in the context of a turbine (e.g., steam, water, or gas turbine), it is important to note that the disclosed turbomachine blade assemblies may be used with other turbomachines, such as compressors or pumps.

Figure 1:
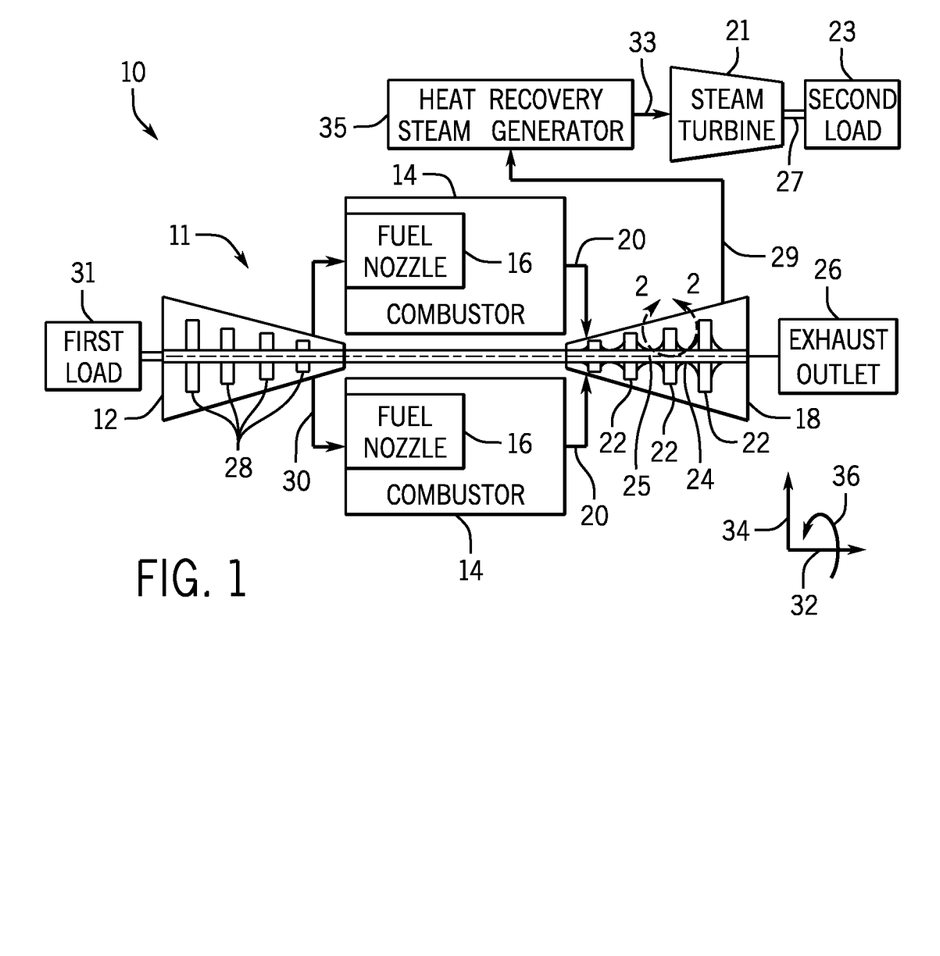
FIG. 1 is a schematic of an embodiment of a combined cycle power generation system having a gas turbine system, a steam turbine, and a heat recovery steam generation (HRSG) system.

Turning now to the drawings, FIG. 1 is a schematic block diagram of an embodiment of a combined cycle system 10 having various turbomachines that are equipped with improved turbomachine blade assemblies. Specifically, the turbomachines include turbomachine blade assemblies, which may be formed from a plurality of plies or layers of material, such as a ceramic-based composite. For example, the plurality of plies or layers of material may be laminated to one another. In certain embodiments, each turbomachine blade assembly may include multiple components, such as a blade portion (e.g., airfoil), a platform, a mounting portion (e.g., a dovetail joint), and so forth, some or all of which may be formed from a plurality of laminated plies or layers of material. As shown, the combined cycle system 10 includes a gas turbine system 11 having a compressor 12, combustors 14 having fuel nozzles 16, and a gas turbine 18. The fuel nozzles 16 route a liquid fuel and/or gas fuel, such as natural gas or syngas, into the combustors 14. The combustors 14 ignite and combust a fuel-air mixture, and then pass hot pressurized combustion gases 20 (e.g., exhaust) into the gas turbine 18. Turbine blades 22 (e.g., turbomachine blade assemblies) are coupled to a rotor 24, which is also coupled to several other components throughout the combined cycle system 10, as illustrated. For example, the turbine blades 22 may be improved turbine blades 22 formed form a plurality of laminated plies or layers, as discussed in detail below. As the combustion gases 20 pass through the turbine blades 22 in the gas turbine 18, the gas turbine 18 is driven into rotation, which causes the rotor 24 to rotate along a rotational axis 25. Eventually, the combustion gases 20 exit the gas turbine 18 via an exhaust outlet 26 (e.g., exhaust duct, exhaust stack, silencer, etc.).

In the illustrated embodiment, the compressor 12 includes compressor blades 28. The compressor blades 28 within the compressor 12 are also coupled to the rotor 24, and rotate as the rotor 24 is driven into rotation by the gas turbine 18, as described above. Additionally, the compressor blades 22 may also be formed from a plurality of laminated plies or layers. As the compressor blades 28 rotate within the compressor 12, the compressor blades 28 compress air from an air intake into pressurized air 30, which is routed to the combustors 14, the fuel nozzles 16, and other portions of the combined cycle system 10. The fuel nozzles 16 then mix the pressurized air and fuel to produce a suitable fuel-air mixture, which combusts in the combustors 14 to generate the combustion gases 20 to drive the turbine 18. Further, the rotor 24 may be coupled to a first load 31, which may be powered via rotation of the rotor 24. For example, the first load 31 may be any suitable device that may generate power via the rotational output of the combined cycle system 10, such as a power generation plant or an external mechanical load. For instance, the first load 31 may include an electrical generator, a propeller of an airplane, and so forth.

The system 10 also includes a steam turbine 21 for driving a second load 23 (e.g., via rotation of a shaft 27). The second load 23 may also be an electrical generator for generating electrical power. However, both the first and second loads 31 and 23 may be other types of loads capable of being driven by the gas turbine system 11 and the steam turbine 21. In addition, although the gas turbine system 11 and the steam turbine 21 drive separate loads (e.g., first and second loads 31 and 23) in the illustrated embodiment, the gas turbine system 11 and steam turbine 23 may also be utilized in tandem to drive a single load via a single shaft.

The system 10 further includes a HRSG system 35. Heated exhaust gas 29 from the turbine 18 is transported into the HRSG system 35 to heat water to produce steam 33 used to power the steam turbine 21. As will be appreciated, the HRSG system 35 may include various economizers, condensers, evaporators, heaters, and so forth, to generate and heat the steam 33 used to power the steam turbine 21. The steam 33 produced by the HRSG system 35 passes through turbine blades of the steam turbine 21. As the steam 33 pass through the turbine blades in the steam turbine 21, which may be formed from a plurality of laminated plies or layers, the steam turbine 21 is driven into rotation, which causes the shaft 27 to rotate, thereby powering the second load 23.

In the following discussion, reference may be made to various directions or axes, such as an axial direction 32 along the axis 25, a radial direction 34 away from the axis 25, and a circumferential direction 36 around the axis 25 of the steam turbine 21. Additionally, as mentioned above, while the improved turbomachine blades described below may be used with any of a variety of turbomachines (e.g., compressors 12, gas turbines 18, or steam turbines 21), the following discussion describes improved turbomachine blades in the context of the turbine 18 (e.g., a gas turbine).

Figure 2:
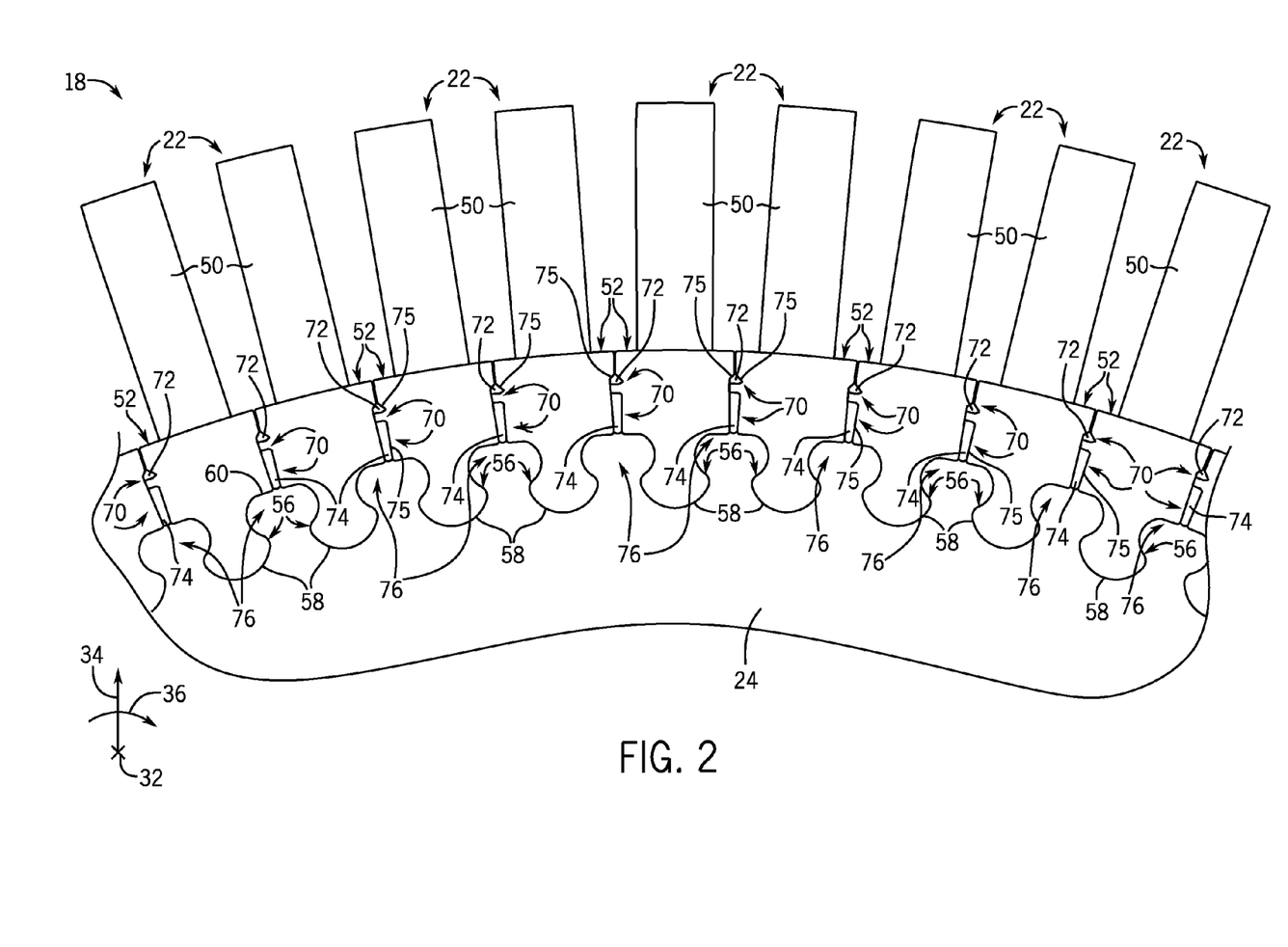
FIG. 2 is a partial cross-sectional axial view of a turbomachine, illustrating axially mounted turbomachine blades having mounting segments, in accordance with embodiments of the present disclosure.

FIG. 2 is a partial cross-sectional axial 32 view of the turbine 18 with the turbine blades 22 coupled to the rotor 24. In the illustrated embodiment, each of the turbine blades 22 includes multiple components, which may be formed from a plurality of laminated plies or layers, as described in detail below. For example, each turbine blade 22 may include a blade portion 50 (e.g., an airfoil), a platform 52, and a mounting insert portion 56 (e.g., a dovetail joint, mounting segment portion, or dovetail insert). Specifically, the dovetail 56 of each turbine blade 22 is configured to engage with a recess or slot 58, such as an axial or a circumferential slot formed in an outer surface 60 of the rotor 24. For example, the dovetail 56 may engage with a second dovetail portion or dovetail slot formed in the rotor 24. In one embodiment, the slots 58 may extend in the circumferential direction 36 completely around (e.g., encircling) the rotor 24. In another embodiment, the rotor 24 may include a plurality of axial slots 58 spaced apart from one another circumferentially 36 about the rotor 24. The illustrated embodiment shows a single stage 60 of turbine blades 22 coupled to the rotor 24. As used herein, a "stage" of turbine blades 22 refers to those turbine blades 22 extending circumferentially 36 around the rotor 24 at a certain axial 32 location along the rotor 24. Additionally, as mentioned above, the turbine blades 22 in the illustrated embodiment are axially 32 mounted (e.g., by the dovetails 56) in the slots 58. In other words, the slots 58 formed in the rotor 24 extend axially 32 along the rotor 24. As will be appreciated, the dovetail 56 of each respective turbine blade 22 may be coupled to the rotor 24 by axially 32 inserting the dovetail 56 into one of the slots 58.

As mentioned above, each turbine blade 22 may include the airfoil 50, the platform 52, and the dovetail 56. The airfoil 50 forms the blade portion of the blade 22, while the platform 54, the dovetail 56, and other components of the turbine blade 22 described below define a base portion or mounting portion of the blade 22. As described below, each turbine blade 22 may be formed as a single piece from multiple laminated layers (e.g., plies). More specifically, each of the components of the turbine blade 22 (e.g., airfoil 50, platform 52, dovetail 56, etc.) may be formed from a plurality of laminated plies or layers, and each of the components of the turbine blade 22 (e.g., airfoil 50, platform 52, dovetail 56, etc.) may be also be joined or laminated together to form a single piece turbine blade 22. Furthermore, each laminated layer may be composed of a composite material, such as a ceramic matrix composite material, and may have a plurality of fibers (e.g., ceramic fibers, such as silicon carbide, oxide, or carbon fibers) embedded in a matrix material (e.g., a ceramic matrix material, such as silicon carbide or oxide matrices). In particular, in certain embodiments, the amount of ceramic fibers dispersed through the ceramic matrix composite material of each layer or ply (see FIG. 6) may be approximately the same. In other embodiments, the plurality of ceramic fibers dispersed through the ceramic matrix composite material of layer may vary to increase or decrease the resistance to vibratory loads acting on the component that is formed by the layer or ply. As will be appreciated, composite materials may be capable of withstanding higher temperatures and have greater longevities than metallic materials. Additionally, composite materials may require less cooling than metallic materials. Furthermore, composite materials may be lighter weight, which may enable improved response of the turbine 18.

Furthermore, in the illustrated embodiment, sealing pins 70 are positioned between each of the turbine blades 22. More specifically, horizontal sealing pins 72 and vertical sealing pins 74 are positioned between each of the turbine blades 22. For example, the sealing pins 70 may be positioned between respective platforms, platform arches, angel wings, or other components of adjacent turbine blades 22. In certain embodiments, one or more components of the turbine blades 22 may include recesses 75 configured to receive and constrain the sealing pins 70. In this manner, the sealing pins 70 may seal a shank cavity 76 beneath the platform 52 of each turbine blade 22. For example, the recesses 75 may be formed by a machining process, or the recesses 75 may be formed by positioning layers plies about the recesses 75 to form the recesses 75. As will be appreciated, the shank cavity 76 may be filled with a pressurized fluid (e.g., air, nitrogen, $CO_2$, etc.) that may be supplied by the compressor 12, the combustor 14, or other component of the combined cycle system 10. For example, the pressurized fluid may be a purge flow within the rotor 24. In the manner described below, the pressurized fluid may be exposed to an airfoil cavity of the airfoil 50 of each turbine blade 22. As such, the pressurized fluid may pressurize the interior of the turbine blade 22, thereby improving turbine blade 22 resiliency and increasing the turbine blade 22 resistance to impact from debris or other foreign objects traveling through the turbine 18.

Figure 3:
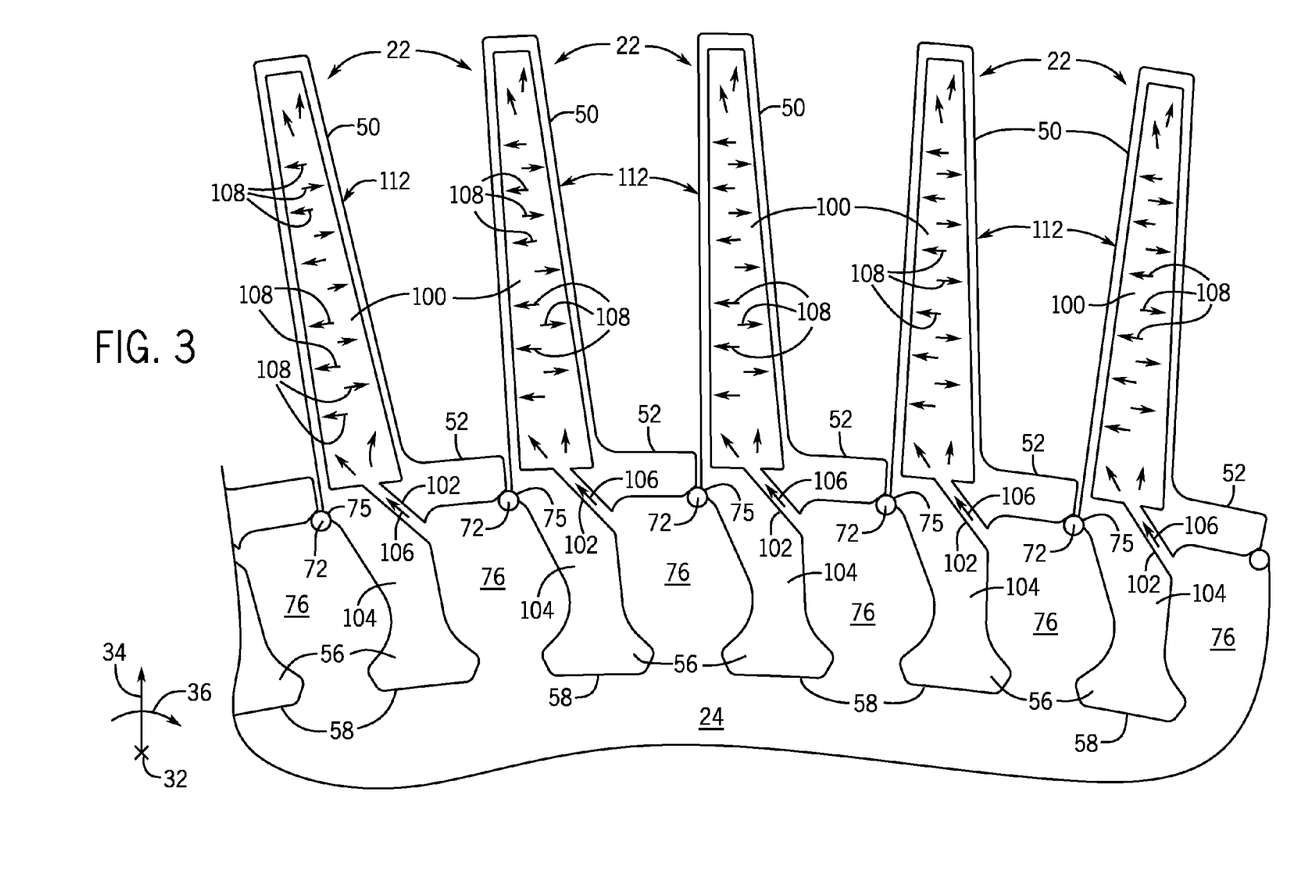
FIG. 3 is a partial cross-sectional axial view of a turbomachine, illustrating axially mounted turbomachine blades having mounting segments, in accordance with embodiments of the present disclosure.

FIG. 3 is a partial cross-sectional axial view of the turbine 18 with the turbine blades 22 coupled to the rotor 24, illustrating an airfoil cavity 100 of each turbine blade 22 exposed to the shank cavity 76 beneath the platform 52 of each turbine blade 22. Specifically, in the illustrated embodiment, the airfoil 50 of each turbine blade 22 is hollow, thereby forming the airfoil cavity 100 of each turbine blade 22. Additionally, each airfoil cavity 100 is fluidly coupled to the shank cavity 76 by a pressurization port 102 formed in a shank 104 of each turbine blade 22. That is, the pressurization port 102 extends from the airfoil cavity 100 to the shank cavity 76. As a result, a pressurized fluid (e.g., pressurized air, nitrogen, $CO_2$) within the shank cavity 76 may flow into the airfoil cavity 100 of each turbine blade 22, as indicated by arrow 106. Within the airfoil cavity 100, the pressurized fluid may exert an outward pressure, as indicated by arrows 108, on an interior surface 110 of the airfoil 50. In this manner, the pressurized fluid may help protect the airfoil 50 from foreign object impact degradation. That is, the pressurized fluid may maintain an outward pressure on the airfoil 50 from within the airfoil cavity 100, thereby enabling a resistance to impact from foreign objects on an outer surface 112 of the airfoil 50 and resiliency of the turbine blade 22. Additionally, in such an embodiment, the turbine blade 22 may not be cooled. However, in other embodiments, the turbine blade 22 may be cooled.

Figure 4:
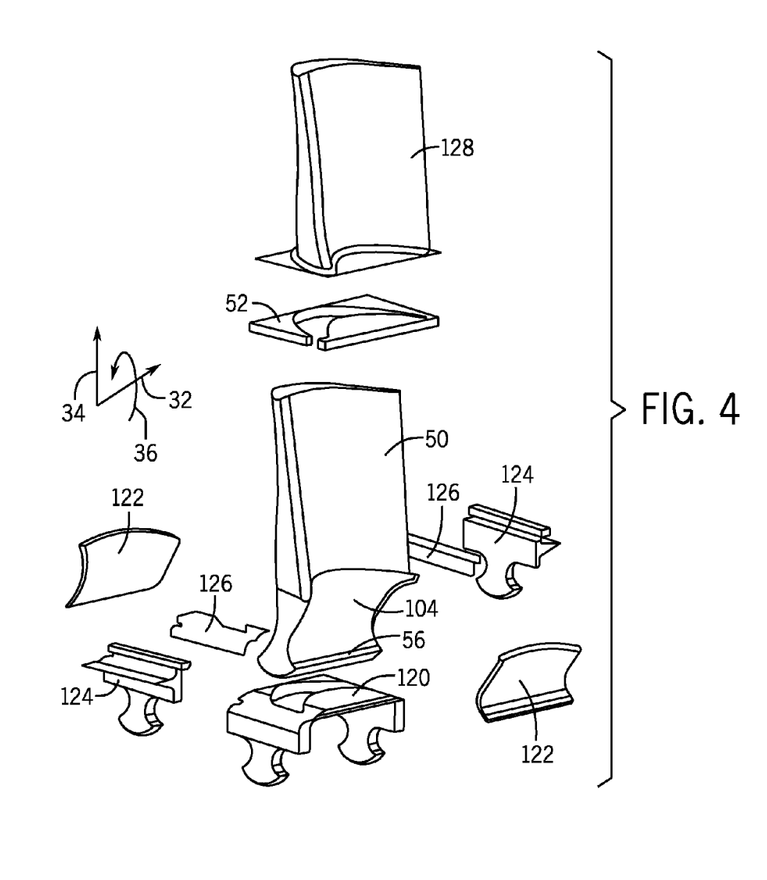
FIG. 4 is an exploded perspective view of a turbomachine blade assembly, in accordance with embodiments of the present disclosure.

FIG. 4 is an exploded perspective view of the turbine blade 22 (e.g., turbomachine blade assembly), illustrating various components that are assembled to form the turbine blade 22. As mentioned above, the turbine blade 22 includes the airfoil 50, the platform 52, the dovetail 56, and the shank 104. However, in certain embodiments, the turbine blade 22 may not include the platform 52. Furthermore, the turbine blade 22 may include a platform arch 120, shank arches 122, angel wings 124, fillers 126, and a fillet layer 128. As mentioned above, any or all of the various components of the turbine blade 22 may be formed from a plurality of laminated plies or layers (e.g., ceramic-based composite plies or layers). Additionally, the various components of the turbine blade 22 may be further laminated, processed, and/or machined to one another to form a single piece turbine blade 22.

As discussed in detail below, each of the plies or layers used to form one or more of the components of the turbine blade 22 may be ceramic-based composite layers. For example, the layers may be made of a ceramic matrix with ceramic fibers distributed throughout the ceramic matrix. In certain embodiments, the amount (e.g., percentage or weight per unit volume) of ceramic fibers distributed throughout the ceramic matrix may be the same for all layers used to form the components of the turbine blade 22. In other embodiments, certain layers may include more ceramic fibers distributed throughout the ceramic matrix than other layers. For example, the layers or plies used to make the shank plies may include more ceramic fibers within the ceramic matrix than the layers or plies used to make the airfoil 50, or vice versa. As will be appreciated, other layers or plies of ceramic-based composite that are used to make other components of the turbine blade 22 (e.g., the platform arch 120, the angel wings 124, the fillers 126, and/or the fillet layer 128) may also include other amounts (e.g., percentage or weight per unit volume) of ceramic fibers distributed throughout the ceramic matrix.

Figures 5, 6:
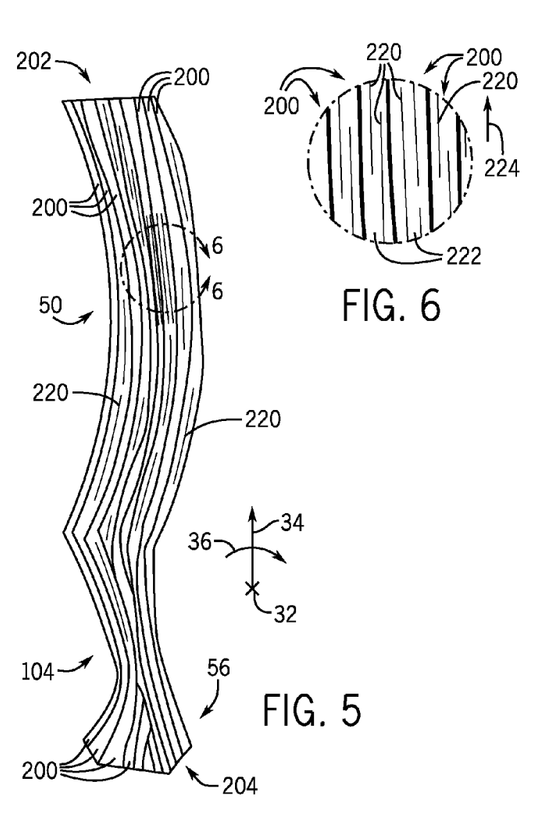
FIG. 5 is a cross section of a turbomachine blade, in accordance with embodiments of the present disclosure.
FIG. 6 is a schematic illustrating a material composition of a plurality of laminates used to form components of the turbomachine blade assembly.

FIG. 5 is a side view of various components of the turbine blade 22, which may be formed by a plurality of laminated layers or plies 200. Specifically, the illustrated embodiment shows the airfoil 50, the shank 104, and the dovetail 56 of the turbine blade 22. The airfoil 50, the shank 104, and the dovetail 56 are formed together by the same set of plies 200. In other words, one ply 200 extends from a tip 202 of the airfoil 50 to a base 204 of the dovetail 56. As shown, the plies 200 are positioned adjacent to one another to form the single piece airfoil 50, shank 104, and dovetail 56. For example, in certain embodiments, the plies 200 may be placed within a mold or other tooling or machining structure to form the plies 200 in a desired shape or configuration. Within a mold structure, the plies 200 may be compacted and/or pressed against one another. In the manner described below, additional plies 200 may be added to the plies 200 forming the airfoil 50, shank 104, and dovetail 56 to form other components of the turbine blade 22. Additionally, the plies 200 forming the other various components of the turbine blade 22 may be further laminated and machined. Additionally, other tooling processes may be used to affix the plies 200 to one another.

Any number of plies 200 may be used to form the various components of the turbine blade 22 (e.g., the airfoil 50, shank 104, and dovetail 56). For example, the combined airfoil 50, shank 104, and dovetail 56 in the illustrated embodiment may be formed with 10 to 1000, 50 to 500, 100 to 400, or 200 to 300 plies 200. Additionally, while the illustrated embodiment of the airfoil 50 is solid, the airfoil 50 may also be hollow, as described above. Specifically, plies 200 may be used to form the airfoil 50 having the airfoil cavity 100 and the shank 104 having the pressurization port 102. In this manner, a pressurized fluid may be supplied to the airfoil cavity 100 from the shank cavity 76 of the turbine 18.

As mentioned above, the plies 200 may be composed of a ceramic-based composite material. For example, as shown in FIG. 6, each ply 200 may include a plurality of fibers 220 (e.g., ceramic fibers) distributed throughout a matrix material 222 (e.g., ceramic matrix material). The fibers 220 are positioned within the matrix material 222 in an axial direction 224 relative to the ply 200. Additionally, in certain embodiments, the fibers 220 may extend an entire length of the plies 200. In other embodiments, the fibers 220 may be segmented. That is, the fibers 220 may extend only partially a full length of each ply 200. However, when forming one of the components of the turbine blade 22, the plies 200 may be oriented such that the fibers 220 within the matrix 222 are oriented in any desired direction relative to the turbine 18. For example, in the plies 200 forming the airfoil 50, the shank 104, and the dovetail 56, the fibers 220 may extend in the radial direction 34 within the matrix material 222. However, in the plies 200 that are used to form the platform 52, the fibers 220 may be extend in the circumferential direction 36 within the matrix material 222. Additionally, as mentioned above, the amount (e.g., percentage or weight per unit volume) of fibers 220 distributed throughout the matrix material 222 may be the same or different for all plies 200 used to form the components of the turbine blade 22.

Figure 7:
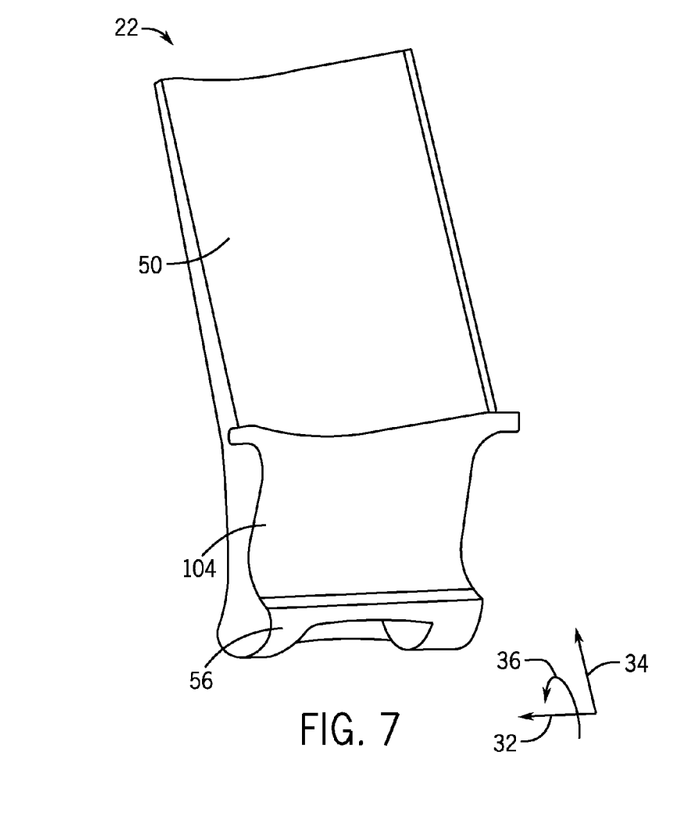
FIGS. 7-13 are perspective views of a partial turbomachine blade assembly, illustrating steps of a process of assembling the turbomachine blade assembly.

FIGS. 7-13 are perspective views of the turbine blade 22, illustrating assembly of various components of the turbine blade 22. However, it should be appreciated that the discussion below is one non-limiting example of forming and assembling the turbine blade 22 and its components from a plurality of plies 200. For example, FIG. 7 is a perspective view of the airfoil 50, shank 104, and dovetail 56. As discussed above, the airfoil 50, shank 104, and dovetail 56 may form a single piece. Additionally, the single piece airfoil 50, shank 104, and dovetail 56 may be formed form the plies 200 described above. That is, ceramic-based composite plies 200 may be used to form the airfoil 50, shank 104, and dovetail 56. For example, the plies 200 may be positioned in a mold structure or other tooling component. Within the mold structure or other tooling component, the plies 200 may be pressed together and laminated to form the single component (e.g., combined airfoil 50, shank 104, and dovetail 56).

Figure 8:
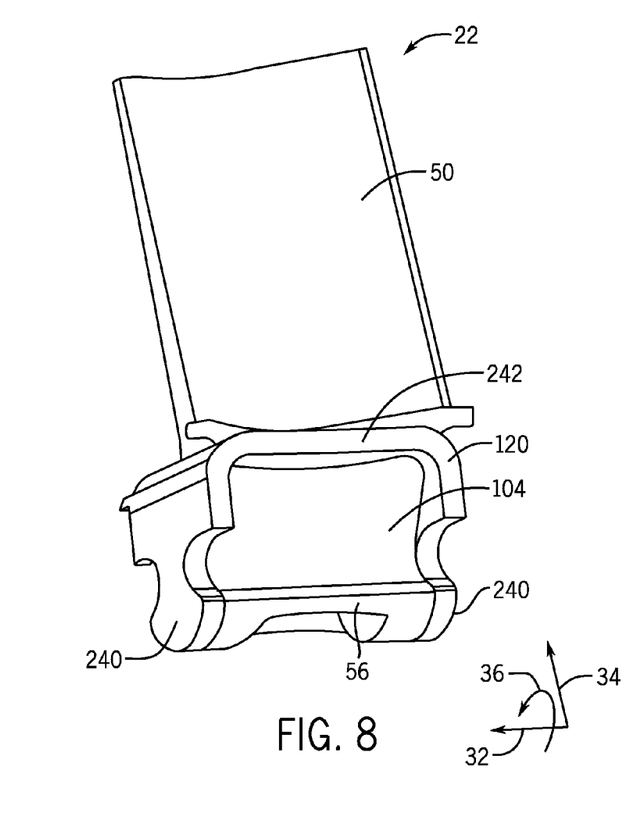

FIG. 8 is a perspective view of the platform arch 120 formed on the combined airfoil 50, shank 104, and dovetail 56. As similarly described above, the platform arch 120 may also be formed with a plurality of laminated plies 200. For example, after the combined airfoil 50, shank 104, and dovetail 56 is formed, additional plies 200 may be positioned within a mold structure or other tooling component (e.g., which may be the same or different as the mold structure or tooling component used to form the combined airfoil 50, shank 104, and dovetail 56) and about the shank 104 and dovetail 56. Thereafter, the plies 200 forming the platform arch 120 may be pressed and laminated. In this manner, the airfoil 50, shank 104, dovetail 56, and platform arch 120 may be joined to form a single piece.

As will be appreciated, the platform arch 120 may be configured to carry or transfer a load on the platform 52 (or flow path) to the rotor 24. Additionally, the arch geometry of the platform 120 may enable an increase in stiffness and/or robustness of the platform arch 120 and the turbine blade 22. As shown, the platform arch 120 includes dovetail portions 240, which abut and have a similar geometry as the dovetail 56 of the turbine blade 22. As a result, the dovetail portions 240 of the platform arch 120 may be coupled to the rotor 24 within slots 58 of the rotor 24. Furthermore, the dovetail portions 240 of the platform arch 120 extend from a platform surface 242 of the platform arch 120. In certain embodiments, the platform 52 (see FIG. 4) may be positioned over or on top of the platform arch 120. In other embodiments, the turbine blade 22 may not include the platform 52, and the platform surface 242 of the platform arch 120 may at least partially define a flow path (e.g., for combustion gases 20) flowing through the turbine 18. Furthermore, in certain embodiments, the platform arch 120 may include the recesses 75 (see FIG. 2) for supporting the sealing pins 70.

Figure 9:
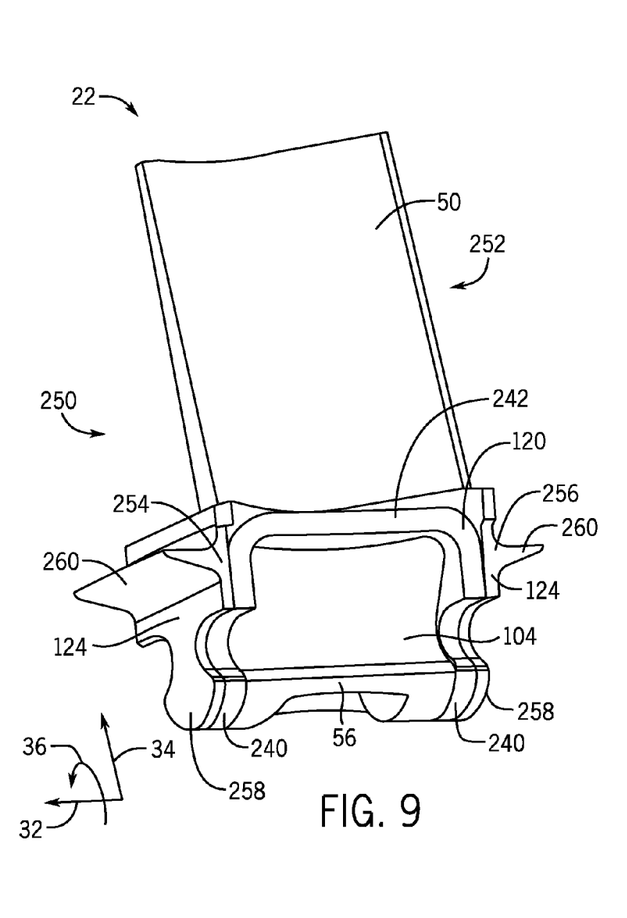

FIG. 9 is a perspective view of the angel wings 124 formed on the combined airfoil 50, shank 104, dovetail 56, and platform arch 120. Specifically, the angel wings 124 are positioned against the platform arch 120 on an upstream side 250 and a downstream side 252 of the turbine blade 22. In other words, the turbine blade 22 includes an upstream or forward angel wing 254 and a downstream or aft angel wing 256. Additionally, each angel wing 124 includes a dovetail portion 258, which abuts the dovetail portions 240 of the platform arch 120. As similarly described above, the dovetail portions 258 may engage with one of the slots 58 formed in the rotor 24, thereby transferring a load from the turbine blade 22 to the rotor 24. As will be appreciated, the angel wings 124 may include features, such as lateral platforms 260 extending laterally outward from the angel wings 124, configured to at least partially seal the turbine blades 22 to one another and to other components of the turbine 18. For example, the lateral platforms 260 may further define the flow path within the turbine, thereby guiding and/or direction gas flow (e.g., flow of combustion gases 20) within the turbine 18.

As similarly described above, the angel wings 124 may also be formed from a plurality of plies 200. For example, after the combined airfoil 50, shank 104, dovetail 56, and platform arch 120 is formed, additional plies 200 may be positioned within a mold structure or other tooling component (e.g., which may be the same or different as the mold structure or tooling component used to form the combined airfoil 50, shank 104, dovetail 56, and platform arch 120) to form the angel wings 124. Thereafter, the plies 200 forming the angel wings 124 may be pressed and laminated. In this manner, the airfoil 50, shank 104, dovetail 56, platform arch 120, and angel wings 124 may be joined to form a single piece.

Figure 10:
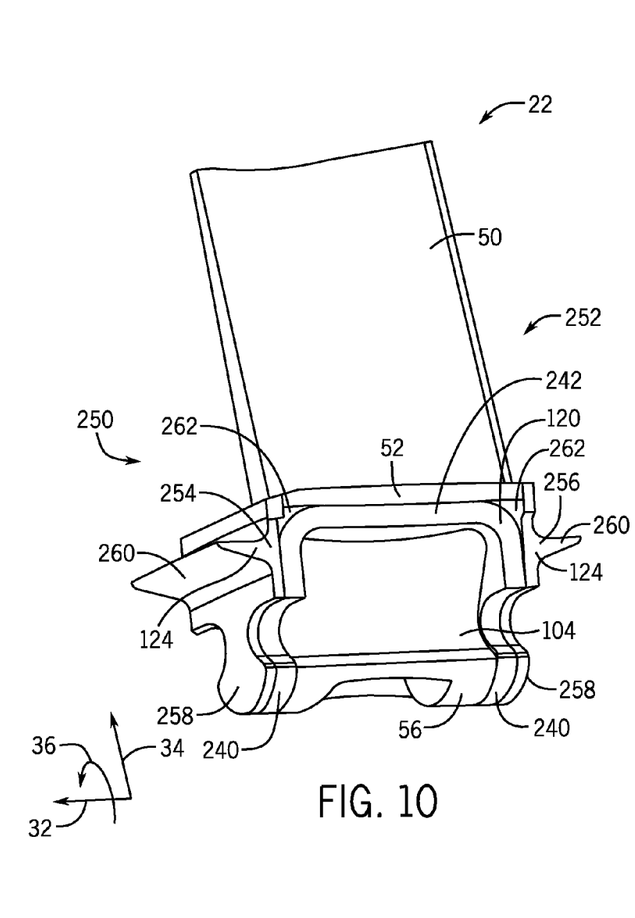

FIG. 10 is a perspective view of the platform 52 formed on the combined airfoil 50, shank 104, dovetail 56, platform arch 120, and angel wings 124. As mentioned above, the platform 52 may be formed on the platform surface 242 of the platform arch 120. As will be appreciated, the platform 52 at least partially defines a flow path for gases (e.g., combustion gases 20) flowing through the turbine 18. Additionally, the platform 52 may also be formed from a plurality of plies 200 (e.g., stacked in a radial 34 fashion or arrangement). For example, after the combined airfoil 50, shank 104, dovetail 56, platform arch 120, and angel wings 124 is formed, additional plies 200 may be positioned within a mold structure or other tooling component (e.g., which may be the same or different as the mold structure or tooling component used to form the combined airfoil 50, shank 104, dovetail 56, platform arch 120, and angel wings 124) to form the platform 52. Thereafter, the plies 200 forming the platform 52 may be pressed and laminated. In this manner, the airfoil 50, shank 104, dovetail 56, platform arch 120, angel wings 124, and platform 52 may be joined to form a single piece.

Additionally, in the illustrated embodiment, the turbine blade 22 includes fillers 262 positioned between the platform 52 and the platform arch 120 (e.g., the platform surface 242). As will be appreciated, the fillers 262 may fill a gap between the platform arch 120 and the platform 52. In certain embodiments, the fillers 262 may also be formed from the plies 200 (e.g., ceramic-based composite plies 200). For example, the fillers 262 may include plies 200 that are laid flat or rolled up. In other embodiments, the plies 200 forming the fillers 262 may include chopped fibers 220 (e.g., fibers 220 that may not be aligned in a single direction) suspended in the matrix material 222. The fillers 262 may also be made of other materials as well.

Figure 11:
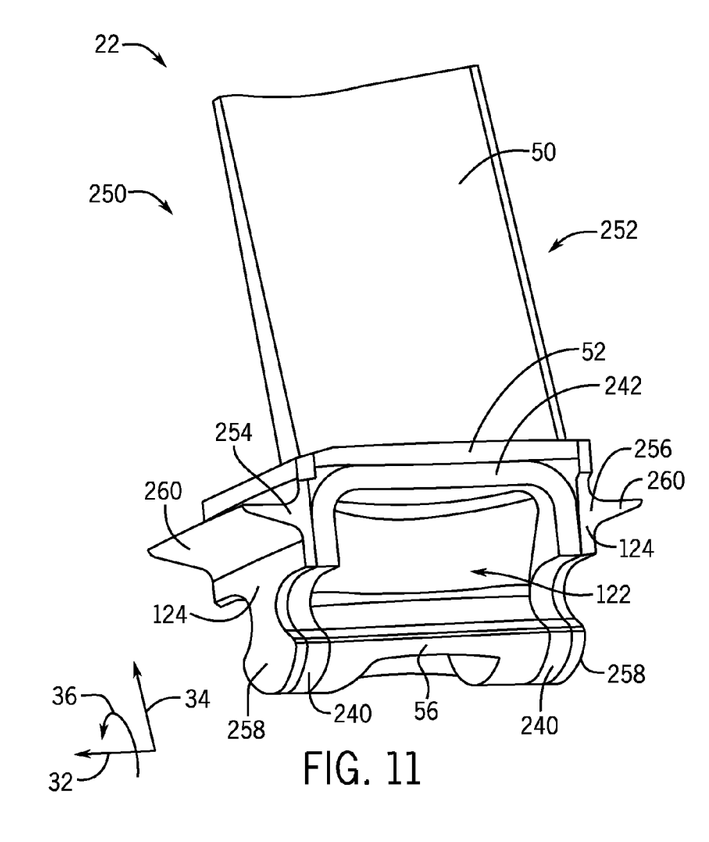

FIG. 11 is a perspective view of the shank arches 122 formed on the shank 104 and airfoil 50 of the turbine blade 22. The shank arches 122 may be configured to provide additional support and/or reinforcement for the shank 104 and airfoil 50 of the turbine blade 22. Additionally, the shank arches 122 may also be formed from a plurality of plies 200. For example, after the combined airfoil 50, shank 104, dovetail 56, platform arch 120, angel wings 124, and platform 52 is formed, additional plies 200 may be positioned within a mold structure or other tooling component (e.g., which may be the same or different as the mold structure or tooling component used to form the combined airfoil 50, shank 104, dovetail 56, platform arch 120, angel wings 124, and platform 52) to form the shank arches 122. Thereafter, the plies 200 forming the shank arches 122 may be pressed and laminated. In this manner, the airfoil 50, shank 104, dovetail 56, platform arch 120, angel wings 124, platform 52, and shank arches 122 may be joined to form a single piece.

Furthermore, as the shank arches 122 may be configured to provide additional support and/or reinforcement for the shank 104 and the airfoil 50, the plies 200 forming the shank arches 122 may have a higher concentration of fibers 220 distributed throughout the matrix material 222, thereby increasing the strength and/or stiffness of the plies 200 forming the shank arches 122. That is, the plies 200 used to form the shank arches 122 may contain more fibers 220 in the matrix material 222 than the plies 200 used to form some of the other components (e.g., airfoil 50, shank 104, dovetail 56, platform arch 120, angel wings 124, and so forth).

Figure 12:
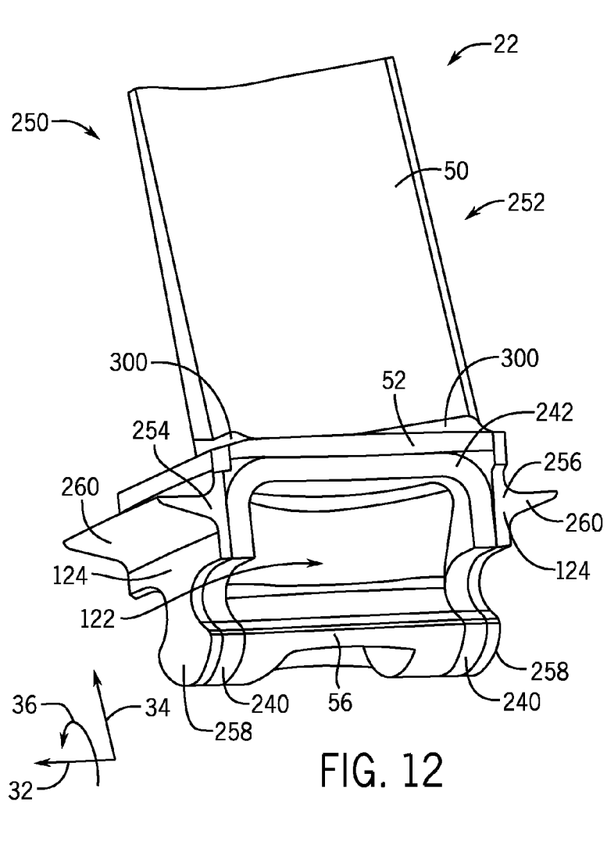

FIG. 12 is a perspective view of a filler material 300 formed across and between the airfoil 50 and the platform 52 of the turbine blade 22. Specifically, the filler material 300 may include plies 200 that are positioned across the joint between the airfoil 50 and the platform 52 to smooth the transition between the airfoil 50 and the platform 52. As similarly described above with respect to the fillers 262, the filler material 300 may be plies 200 that are laid flat or rolled up. In other embodiments, the filler material 300 may be plies 200 including chopped fibers 220 (e.g., fibers 220 that may not be aligned in a single direction) suspended in the matrix material 222. Additionally, in certain embodiments, the filler material 300 may be a ceramic-based composite material (e.g., ceramic matrix material 222 with ceramic fibers 220 distributed therein) that is formed (e.g., cut) to fit the intersection between the airfoil 50 and the platform 52. For example, the filler material 300 may have a generally triangular shape that creates a smooth transition between the airfoil 50 and the platform 52.

Figure 13:
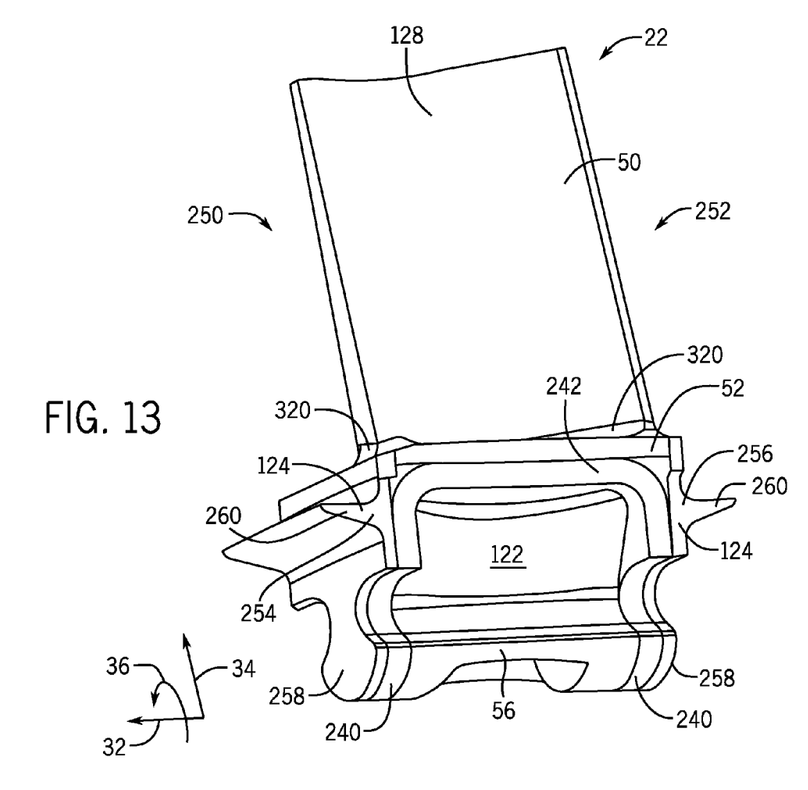

FIG. 13 is a perspective view of the fillet layer 128 formed over, across, and between the airfoil 50 and the platform 52 of the turbine blade 22. Specifically, the fillet layer 128 may be formed from the plies 200 and may create a smooth surface transition (e.g., a fillet transition 320) between the airfoil 50 and the platform 52.

In certain embodiments, once the plies 200 of some or all components of the turbine blade 22 are positioned and laminated to one another, the turbine blade 22 may undergo one or more machining processes. For example, the turbine blade 22 may be positioned within a mold structure or tool (e.g., autoclave) for pressurization. Within the tool, the plies 200 may be debulked. After the debulking of the plies 200, ply 200 organic volatiles may be removed, and the plies 200 may be infiltrated with resin (e.g., molten silicon). The infiltrated plies 200 solidify into the final turbine blade 22.

As will be appreciated, the construction of the turbine blade 22 described above may enable an increase in the operational life of the turbine 18. For example, the ceramic-based composite material used to form the plies 200 may have an elevated resistance to elevated temperatures. As a result, forced cooling of the turbine blades 22 may be reduced. Additionally, turbine blades 22 formed from ceramic-based composites and/or turbine blades 22 having the airfoil cavity 100 may be more lightweight than traditional turbine blades 22. As such, the rotor 24 may have a longer useable life, thereby reducing costs (e.g., maintenance costs). More particularly, the lightweight configuration and design of the turbine blades 22 reduces the load or pull on the rotor 24. As a result, the rotor 24 may be made from cheaper alloys, more cost-efficient shapes or configurations, or a combination thereof. Additionally, as turbine blades 22 formed from ceramic-based composites may be lighter weight than traditional turbine blades 22, the rotor 24 may speed up faster and may have faster response times.

As discussed in detail above, the disclosed embodiments include an improved turbomachine blade assembly (e.g., turbine blade 22), and a process or method for forming the improved turbomachine blade assembly (e.g., turbine blade 22). More specifically, certain embodiments include a turbomachine blade assembly, where one or more components of the turbomachine blade assembly are formed from a plurality of continuous, fiber-reinforced plies or layers (e.g., plies 200). For example, the turbomachine blade assembly and/or the components of the turbomachine blade assembly (e.g., airfoil 50, shank 104, dovetail 56, platform 52, platform arch 120, and so forth) may be formed by positioning the plurality of continuous, fiber-reinforced plies or layers (e.g., plies 200) in a mold or other tool, and the plies or layers may then be laminated together using a tooling process, a machining process, a chemical process, a metallurgical process, or a combination thereof. For example, the turbomachine blade assemblies may each be formed as a single piece from laminated layers of a composite material, such as a ceramic-based composite material. The ceramic-based composite material may include a ceramic matrix material (e.g., matrix material 222) with ceramic fibers (e.g., fibers 220) dispersed throughout the ceramic matrix material. As a result, the turbomachine blade assemblies may be capable of withstanding elevated temperatures without cooling. Additionally, the turbomachine blade assemblies formed by plies of ceramic-based composite may be more lightweight and may have longer life cycles.

Furthermore, in certain embodiments, the turbomachine blade assembly may include a hollow airfoil. That is, the airfoil (e.g., airfoil 50) may include an airfoil cavity (e.g., airfoil cavity 100). The hollow airfoil may include a passage or port (e.g., pressurization port 102) exposing the hollow interior (e.g., airfoil cavity 100) of the airfoil to a shank cavity (e.g., shank cavity 76) of the turbomachine. In this manner, a pressurized flow (e.g., air, nitrogen, $CO_2$, etc.) within the shank cavity may flow into the hollow interior of the airfoil of the turbomachine blade. As the hollow interior of the airfoil of each turbomachine blade assembly is pressurized, the turbomachine blade assembly may be protected from foreign object damage and impact degradation. Moreover, to maintain pressurization of the flow within the shank cavity and the hollow interiors of the airfoils, sealing pins (e.g., sealing pins 70) may be disposed between the turbomachine blades to block leakage of the pressurized flow from the shank cavity to the surrounding atmosphere.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a turbomachine blade assembly, comprising:
   a blade portion;
   a shank portion; and
   a mounting portion, wherein the blade portion, the shank portion, and the mounting portion comprise a first plurality of plies extending from a tip of the blade portion to a base of the mounting portion, and wherein the blade portion comprises a blade cavity configured to contain a pressurized flow from a shank cavity of the turbomachine blade assembly; and
   a platform arch disposed about the blade portion, the shank portion, and the mounting portion, wherein the platform arch comprises a platform surface and first and second dovetail portions, wherein the first and second dovetail portions extend axially from the platform surface relative to an axis of the turbomachine blade assembly and abut the mounting portion, and wherein the platform arch comprises a second plurality of plies.

2. The system of claim 1, wherein each ply of the first plurality of plies comprises a first plurality of ceramic fibers distributed throughout a first ceramic matrix material, and wherein each ply of the second plurality of plies comprises a second plurality of ceramic fibers distributed throughout a second ceramic matrix material.

3. The system of claim 2, wherein the first plurality of ceramic fibers is oriented along an axis of each ply of the first plurality of plies.

4. The system of claim 2, wherein the turbomachine blade assembly comprises at least one shank arch disposed on an outer surface of the blade portion and the shank portion, wherein the shank arch comprises a third plurality of plies, each ply of the third plurality of plies comprises a third plurality of ceramic fibers distributed throughout a third ceramic matrix material, and a first amount of the third plurality of ceramic fibers distributed throughout the third ceramic matrix material is greater than a second amount of the first plurality of ceramic fibers distributed throughout the first ceramic matrix material.

5. The system of claim 1, wherein the first plurality of plies and the second plurality of plies are laminated to one another to form a single piece.

6. The system of claim 1, wherein the shank portion comprises a pressurization port fluidly coupling the blade cavity and the shank cavity.

7. A system, comprising:
   a first turbomachine blade, comprising:
   a blade portion comprising a hollow cavity;
   a shank portion comprising a pressurization port fluidly coupled to the hollow cavity;
   a mounting portion configured to couple the turbomachine blade to a rotor; and
   a platform arch comprising a platform surface positioned about the shank portion, wherein the platform arch comprises first and second dovetail portions, and wherein the first and second dovetail portions extend axially from the platform surface relative to an axis of the first turbomachine blade and abut the mounting portion.

8. The system of claim 7, wherein the pressurization port extends from the hollow cavity to a shank cavity of the first turbomachine blade.

9. The system of claim 8, comprising a second turbomachine blade disposed adjacent the first turbomachine blade, and a plurality of sealing pins disposed between the first turbomachine blade and the second turbomachine blade, wherein the platform arch comprises at least one recess configured to support at least one sealing pin of the plurality of sealing pins.

10. The system of claim 9, wherein the plurality of sealing pins comprises at least one vertical sealing pin and at least one horizontal sealing pin relative to the axis of the first turbomachine blade.

11. The system of claim 7, wherein the first turbomachine blade comprises a platform positioned on the platform surface.

12. The system of claim 11, wherein the blade portion, the shank portion, and the mounting portion comprise a first plurality of plies, the platform arch comprises a second plurality of plies, and the platform comprises a third plurality of plies.

13. The system of claim 12, wherein the first plurality of plies, the second plurality of plies, and the third plurality of plies are laminated to one another to form a single piece.

14. The system of claim 12, comprising a fillet portion extending across the blade portion and the platform, wherein the fillet portion comprises a fourth plurality of plies.

15. The system of claim 13, wherein each ply of the first, second, and third pluralities of plies comprises a plurality of ceramic fibers distributed throughout a ceramic matrix material.

16. A turbomachine blade assembly, comprising:
a first portion, comprising:
an airfoil portion comprising a hollow cavity;
a shank portion; and
a first dovetail portion;
wherein the first portion comprises a first plurality of plies;
a second portion, comprising:
a platform arch disposed about the first portion, wherein the platform arch comprises a second plurality of plies, wherein the platform arch comprises a platform surface and second and third dovetail portions, wherein the second and third dovetail portions extend axially from the platform surface relative to an axis of the turbomachine blade assembly and abut the first dovetail portion;
a third portion, comprising:
a plurality of angel wings disposed adjacent the platform arch, wherein the plurality of angel wings comprises a third plurality of plies; and
a fourth portion, comprising:
a fillet portion extending over the airfoil portion, wherein the fillet portion comprises a fourth plurality of plies;
wherein the first, second, third, and fourth pluralities of plies are laminated to one another to form a single piece.

17. The system of claim 16, wherein each ply of the first, second, third, and fourth pluralities of plies comprises a plurality of ceramic fibers distributed throughout a ceramic matrix material.

18. The system of claim 1, wherein the turbomachine blade assembly comprises a platform disposed on the platform surface of the platform arch, wherein the platform comprises a third plurality of plies.

19. The system of claim 18, wherein the platform arch is configured to transfer a load on the platform to a rotor having the turbomachine blade assembly.

20. The system of claim 18, wherein the turbomachine blade assembly comprises first and second angel wings disposed adjacent to the platform arch, wherein the first and second angel wings comprise third and fourth dovetail portions, respectively, wherein the third and fourth dovetail portions are configured to abut the first and second dovetail portions, respectively, of the platform arch, wherein the first and second angel wings comprise first and second lateral platforms, respectively, extending laterally outward from the platform arch, and wherein the first and second angel wings comprise a fourth plurality of plies.

21. The system of claim 7, wherein the first turbomachine blade comprises at least one shank arch disposed on an outer surface of the shank portion, wherein the blade portion, the shank portion, and the mounting portion comprise a first plurality of plies, wherein each ply of the first plurality of plies comprises a first amount of fibers distributed throughout a first matrix material, wherein the at least one shank arch comprises a second plurality of plies, wherein each ply of the second plurality of plies comprises a second amount of fibers distributed throughout a second matrix material, and wherein the second amount is greater than the first amount.

22. The turbomachine blade assembly of claim 16, comprising a platform disposed on the platform surface, wherein the platform comprises a fifth plurality of plies, wherein the first, second, third, fourth, and fifth plurality of plies are laminated to one another to form a single piece, and wherein the fillet portion extends over the platform.

23. The turbomachine blade assembly of claim 16, comprising at least one shank arch disposed on an outer surface of the shank portion, wherein each ply of the first plurality of plies comprises a first amount of fibers distributed throughout a first matrix material, wherein the at least one shank arch comprises a fifth plurality of plies, wherein each ply of the fifth plurality of plies comprises a second amount of fibers distributed throughout a second matrix material, and wherein the second amount is greater than the first amount.

* * * * *